United States Patent
Sugiura et al.

[11] Patent Number: 6,119,066
[45] Date of Patent: *Sep. 12, 2000

[54] VEHICLE NAVIGATION SYSTEM AND METHOD FOR SETTING DIRECTION LABELS FOR CONNECTING ROADS

[75] Inventors: Wataru Sugiura, Anjo; Osamu Kanematsu, Nagoya; Hidetoshi Fujimoto, Toyokawa, all of Japan

[73] Assignee: Denso Corporation, Kariya, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/917,847

[22] Filed: Aug. 27, 1997

[30] Foreign Application Priority Data

Aug. 29, 1996 [JP] Japan .................................. 8-228723

[51] Int. Cl.[7] .................................................. G06F 165/00
[52] U.S. Cl. ......................... 701/208; 701/209; 701/201
[58] Field of Search .................................. 701/208, 209, 701/210, 211, 212; 340/990, 995

[56] References Cited

U.S. PATENT DOCUMENTS

| | | | |
|---|---|---|---|
| 5,430,655 | 7/1995 | Adachi | 701/209 |
| 5,442,557 | 8/1995 | Kaneko | 701/213 |
| 5,587,911 | 12/1996 | Asano et al. | 701/202 |
| 5,638,279 | 6/1997 | Kishi et al. | 340/990 |
| 5,729,109 | 3/1998 | Kaneko et al. | 318/587 |
| 5,739,772 | 4/1998 | Nanba et al. | 340/990 |
| 5,874,905 | 2/1999 | Nanba et al. | 340/995 |

FOREIGN PATENT DOCUMENTS

| | | |
|---|---|---|
| 703 434 | 3/1996 | European Pat. Off. . |
| 3-113312 | 5/1991 | Japan . |
| 7-151557 | 6/1995 | Japan . |

*Primary Examiner*—Tan Nguyen
*Attorney, Agent, or Firm*—Pillsbury Madison & Sutro LLP

[57] ABSTRACT

When a vehicle is within a predetermined distance from an intersection during the execution of navigation operations, a navigation system displays an enlarged guide map of the same intersection. The guide map shows direction labels that are set for roads that are connected to a road to be approached by the vehicle. The direction labels are set for the connecting roads by tracking the connecting roads and by determining appropriate direction labels following a predetermined procedure. For example, names of tollgates, names of stations, names of special facilities, names of administrative units, names of highways or the like may be set as direction labels.

34 Claims, 8 Drawing Sheets

VEHICLE NAVIGATION SYSTEM AND METHOD FOR SETTING DIRECTION LABELS FOR CONNECTING ROADS

CROSS REFERENCE TO RELATED APPLICATION

This application is based on and claims priority from Japanese Patent Application No. Hei-8-228723 filed on Aug. 29, 1996, the contents of which are incorporated herein by reference.

BACKGROUND OF THE INVENTION

1. Field of the Invention

The present invention relates to a vehicular navigation system for guiding a vehicle along a route from a starting point to a destination by displaying guide maps of road intersections along such a route. In particular, the present invention relates to a device that displays direction labels of connecting roads connected to road intersections. The present invention also relates to a device for setting the direction labels and a method for doing the same.

2. Description of Related Art

Japanese Patent Laid-Open Publication No. Hei 7-151557 discloses a conventional navigation device that displays a guide map of an intersection at which a vehicle needs to turn, for example, left or right as the vehicle approaches such an intersection. The guide map shows the shape and name of the intersection and the distance from the vehicle's present position to the intersection.

However, in the above-described navigation device, although a driver of the vehicle can recognize the intersection and thus pass through the intersection by following instructions from the navigation device, the conventional navigation device does not teach the driver what direction he is being led to and what lies ahead of the connection road he has taken and the other connection roads.

SUMMARY OF THE INVENTION

In view of the foregoing problems in the prior art, it is a primary object of the present invention to provide a navigation system that displays direction labels for connecting roads connected to a road intersection to inform a driver where the connecting roads lead to and what lies ahead of the connecting roads.

To achieve the aforementioned object, one aspect of the present invention provides a vehicular navigation system that has a display unit, a determination unit and a control unit. The display unit is for displaying a guide map of a road intersection and a connecting road connected to the road intersection. The determination unit determines a direction label of the connecting road based on a direction of entry of a vehicle into the connecting road. The control unit controls the display unit to display the guide map and the direction label of the connecting road when the vehicle is within a predetermined distance from the road intersection.

In this way, the driver can readily determine where a connecting road is leading to by referring to the direction label displayed by the display unit. This direction label can be determined by tracking each connecting road.

Preferably, the direction label may be one of the name of a tollgate, the name of a station, the name of a special facility, the name of an administrative unit and the name of a highway.

Preferably, data of the direction labels determined for the connection roads are stored in a map data storage medium, such as a CD-ROM or the like so that the direction labels can be readily displayed when the display unit displays the intersection guide map.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PRESENTLY PREFERRED EXEMPLARY EMBODIMENT

A preferred embodiment of the present invention is hereinafter described with reference to the accompanying drawings.

Figure 1:
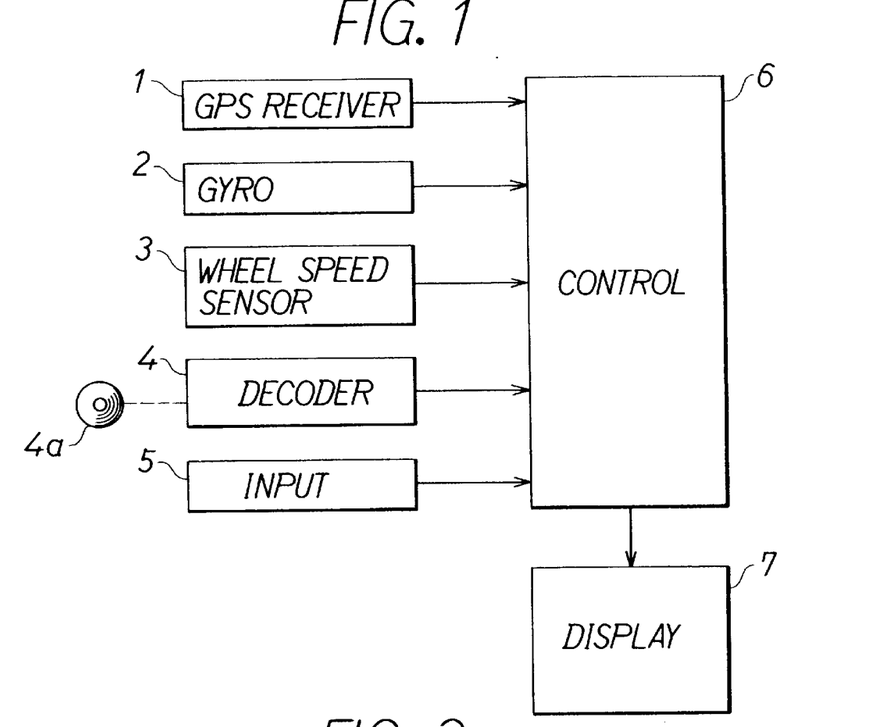
FIG. 1 is a block diagram illustrating the overall construction of a vehicular navigation system according to an embodiment of the present invention.

As shown in FIG. 1, a vehicular navigation device according to an embodiment of the present invention includes a GPS (Global Positioning System) receiver 1, a gyro 2 and a wheel speed sensor 3, which are all used for detecting a present position of a vehicle. The GPS receiver 1 receives radio waves from satellites and generates a signal that is indicative of the present position of the vehicle. The gyro 2 generates a signal corresponding to an angular speed of the vehicle with respect to the horizontal axis. The wheel speed sensor 3 determines a traveled distance of the vehicle based on the rotational speeds of wheels of the vehicle and generates a distance signal indicative of the traveled distance.

The vehicular navigation device further includes a decoder 4, an input unit 5, a control unit 6 and a display unit 7. The decoder 4 reads map data from a CD-ROM 4a, which stores map data, and provides the map data to the control unit 6. The input unit 5 has various input keys that can be operated by a passenger of the vehicle and generates various input signals necessary for performing the vehicular navigation operations.

Meanwhile, the control unit 6 includes a microprocessor and the like and executes various computational processes. More specifically, the control unit 6 determines the present position of the vehicle based on signals from the GPS receiver 1, the gyro 2 and the wheel speed sensor 3, reads map data from the CD-ROM 4a, and displays the present position and a road map on the display unit 7. After the passenger has set a destination and the navigation operation is to be executed, the control unit 6 controls the display unit 7 to display a route from a starting point to the destination.

When the vehicle is within a predetermined distance from the next intersection along the route, the control unit 6 controls the display unit 7 to display the guide map of such next intersection.

The display unit 7 is provided in an instrument panel of the vehicle and executes the above-described operation of displaying the guide map based on a display control signal from the control unit 6. A liquid crystal display, a CRT display or the like may be used as the display unit 7. A head-up display device for projecting an image of a guide map of an intersection towards a front windshield of the vehicle may also be used as the display unit 7.

Figure 2:
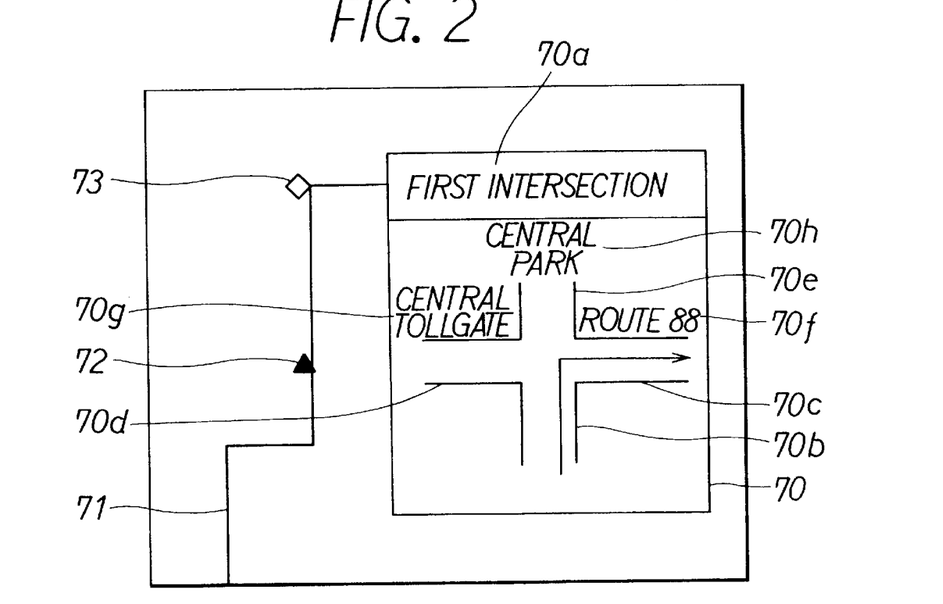
FIG. 2 is a diagram illustrating an example of a guide map of an intersection as displayed by the navigation system of the present invention.

As shown in FIG. 2, when the vehicle is within a predetermined distance from a next intersection along the route from the starting point to the destination, the control unit 6 displays an enlarged guide map 70 of such next intersection on the display 7. The guide map of the intersection 70 shows the name 70a of the intersection which is "FIRST INTERSECTION" for this example, the approach road 70b, and connection roads 70c, 70d and 70e. Respective direction labels 70f through 70h (which are, namely, "ROUTE 88", "CENTRAL TOLLGATE" and "CENTRAL PARK" in the example shown in FIG. 2) are assigned to the respective connection roads 70c through 70e. Direction labels as used here and in the appended claims refer to labels assigned to connecting roads that indicate tollgates, places, roads, facilities and the like that lie ahead in the forward direction of the respective connecting roads. As shown in FIG. 2, the display unit 7 also shows the route 71 to the destination, the vehicle's present position 72 and the next intersection 73 (which shall also be referred to as reference intersection hereinafter).

Meanwhile, the CD-ROM 4a stores the map data in such a way that the direction label data are set for the respective connection road data. A process for generating the corresponding direction label data for the respective connection roads will be explained later. Based on the direction label data, the display unit 7 displays the connecting roads 70c–70e together with their respective direction labels 70f–70h in the guide map 70 of the intersection.

The generation of the processed map data, which includes the direction label data and which is stored in the CD-ROM 4a, is explained hereinafter.

Figure 3:
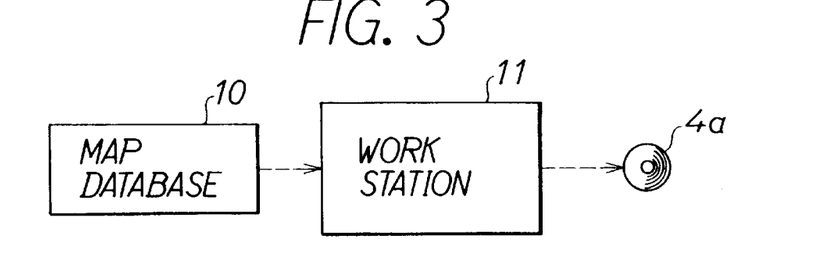
FIG. 3 is a block diagram illustrating the construction of a map data generation device of the present invention.

In this case, as shown in FIG. 3, based on map data (which includes data of the connecting roads that are connected to nodes which represent road intersections and various direction label data which can be assigned to the connecting roads) stored by a map database 10, a workstation 11 determines a direction label for each connecting road by executing a direction label determination process which is described later. In this way, the workstation 11 generates the processed map data by adding direction label data to the map data of the map database 10 and stores the processed map data in the CD-ROM 4a.

The direction label determination process is explained hereinafter with reference to FIG. 4. The workstation 11 executes the direction label determination process by sequentially executing a tollgate name setting process 100, a station name setting process 200, a special facility name setting process 300, an administrative unit name setting process 400, and a highway name setting process 500. Details of these processes 100–500 are explained later. When a direction label is obtained in any of these steps 100–500, such direction label is set as the direction label of the connection road with the workstation 11 terminating the execution of the direction label determination process thereafter. That is, the workstation 11 executes the direction label determination process to set the direction label of the connecting road to be, in descending priority, the name of a tollgate, the name of a station, the name of a special facility/point of interest, the name of an administrative unit and the name of a highway. The direction label data determined by the direction label determination process are mapped with the connecting road data and are added to the map data in the map database 10. The workstation 11 determines that there is no direction label set for the connecting road when no direction label is set in any of steps 100–500.

In the navigation system shown in FIG. 1, with the route from the starting point to the destination being set arbitrarily, the navigation system must display direction labels set for the respective connecting roads that are connected to all respective intersections along the set route in such a way that the direction labels are set for the respective connecting roads with respect to all possible directions of approach (that is, direction of entry) of the vehicle to the connecting roads. More specifically, consider all the connecting roads connected to an intersection.

Figure 4:
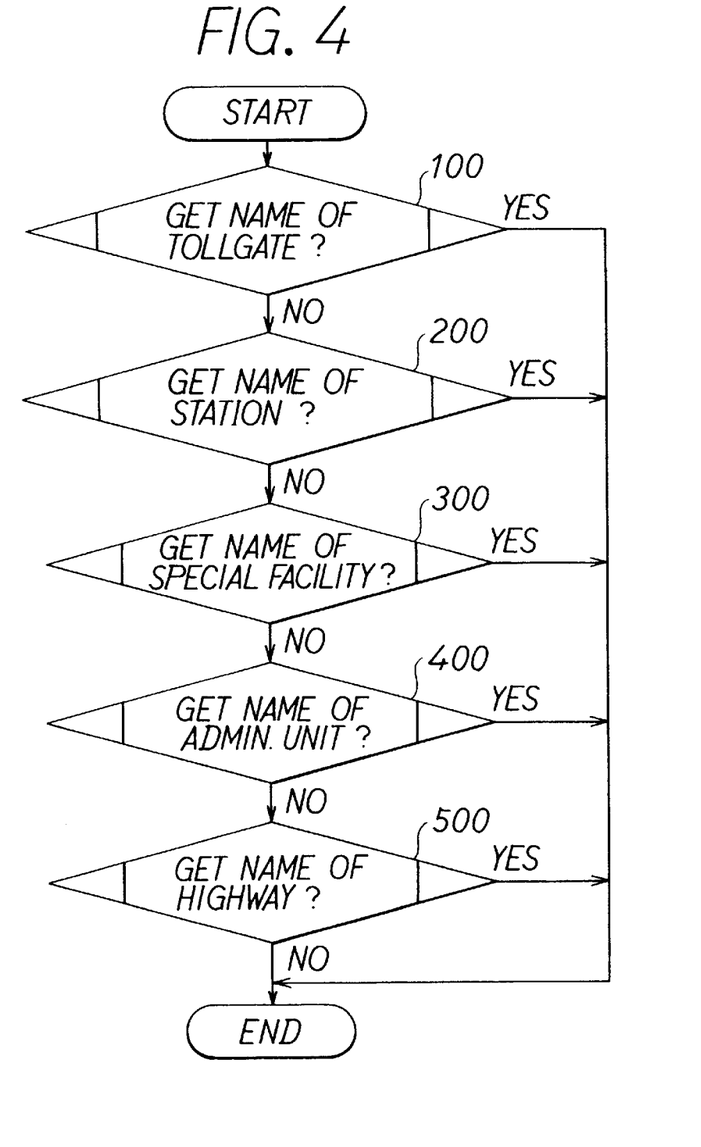
FIG. 4 is a flow chart of an overall process executed by the map data generation device for determining direction labels.

First, one of the connecting roads is set as an approach road (that is, the road where the vehicle will be coming from) and thereafter, the direction label determination process of FIG. 4 is executed with respect to the remaining connecting roads, so that the direction labels are set for respective connecting roads. Next, a different road is set as the approach road and the direction labels for the other connecting roads are set in the same way as in the previous step. Thus, eventually, the direction labels for all connecting roads with respect to any approach road (that is, any direction of entry of the vehicle) at the intersection are set. The same process is executed for all the other intersections, so that the direction labels for all connecting roads of all intersections with respect to any arbitrary approach road are set.

The direction label determination process shown in FIG. 4 is executed only on connecting roads that can be entered. That is, with respect to the direction of approach, the direction label determination process is not executed for connecting roads that do not allow the entry of the vehicle such as one-way roads or the like.

Details of each process of the direction label determination process of FIG. 4 are explained hereinafter.

Figure 5:
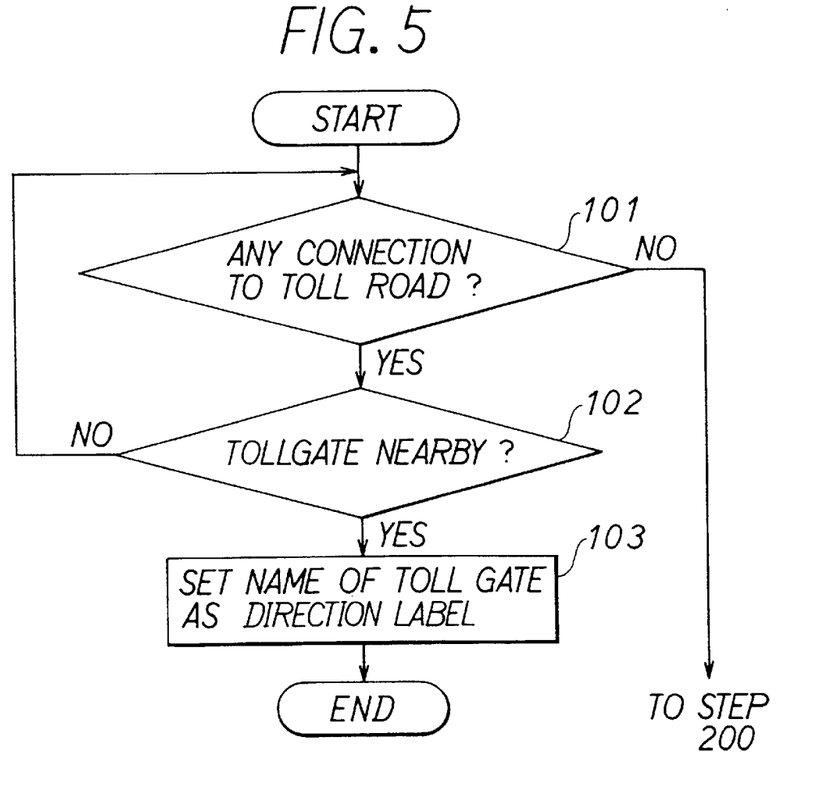
FIG. 5 is a flow chart of a process for setting the name of a tollgate as the direction label.

First, the tollgate name setting process 100, which is shown in detail in FIG. 5, is explained hereinafter. Explanation here will center on the setting of the direction label of a reference connecting road that is connected to a reference intersection (whose guide map is displayed by the display unit 7 when the vehicle is within a predetermined distance from it). The reference connecting road represents an arbitrary road connected to the road intersection.

In this tollgate entrance name setting process, by tracking the connecting road data, step 101 determines (for example, in sequence) whether or not a toll road that can be entered is connected to a node (that is, a road intersection) along the reference connecting road that is within a radius of, for example, 5 km from the reference intersection. If the connecting road is, for example, a city expressway, only those nodes that are within a radius of, for example, 2 km from the reference intersection are considered. When there is a toll road connected to a node along the reference connecting road, step 102 determines whether or not there is a tollgate to the toll road that is within a radius of, for example, 1 km from the same node to which the toll road is connected. When step 102 gives a positive output, step 103 sets the name of the tollgate as the direction label of the reference connection road. When there is a plurality of tollgates within a radius of 1 km from the node to which the toll road is connected, the name of the tollgate nearest to the node is set as the direction label of the reference connection road.

Figure 6:
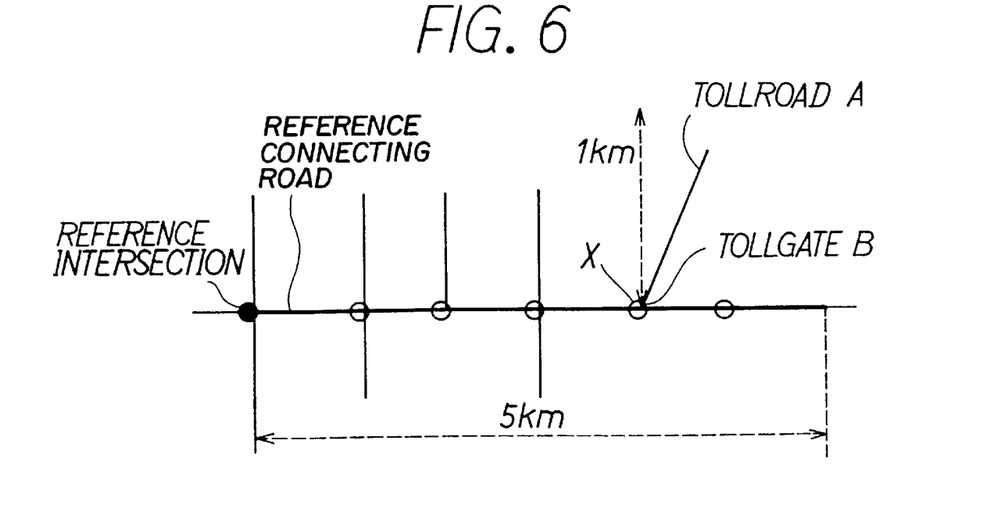
FIG. 6 is a diagram illustrating the setting of the name of a tollgate as the direction label.

A graphic representation of the tollgate name setting process 100 is shown in FIG. 6. The shaded circle in FIG. 6 indicates the reference intersection and the white circles indicate the nodes (that is, the other intersections) along the reference connecting road. It must be noted that the shaded circle and the white circles in FIGS. 9, 11, 13 and 15 also denote the reference intersection and the nodes, respectively. In FIG. 6, toll road A is connected to a node X along the reference connecting road. Because a tollgate B of the toll road A is within a radius of 1 km from the node X, the tollgate name setting process 100 sets "TOLLGATE B" as the direction label of the reference connecting road.

When step 102 gives a negative output, that is, no appropriate tollgate can be found, control goes to the station name setting process 200.

Meanwhile, one preferred method for tracking of nodes along the above-described reference connecting road is explained hereinafter.

Figure 7A:
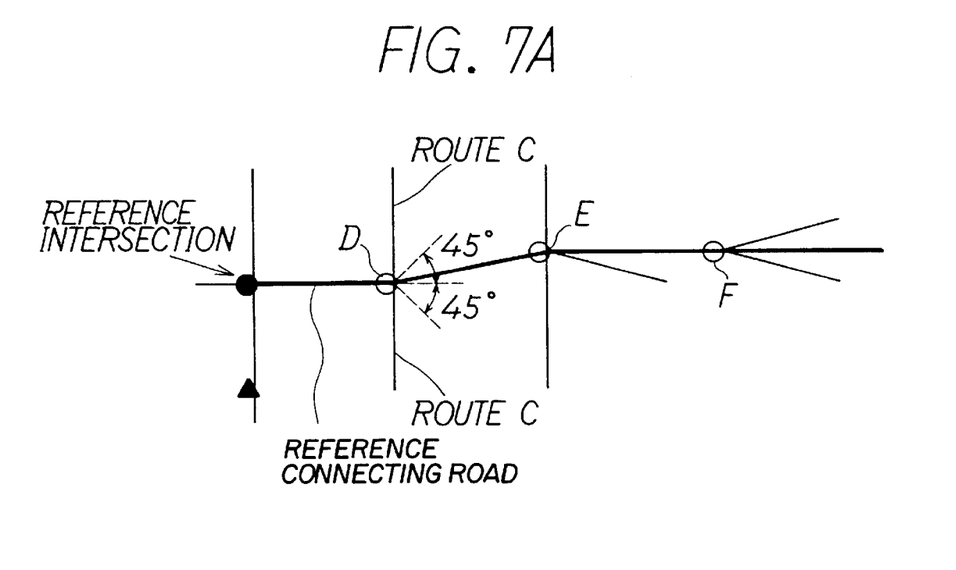
FIGS. 7A and 7B are diagrams illustrating a process for tracking nodes along connection roads.

FIG. 7A illustrates a way of tracking the nodes and segments of the reference connecting road when the reference connecting road is not labeled with a road number, a road name or the like. In this case, when there is a connecting segment (that is, a connecting road) connected to an initial segment (which is connected to the reference intersection) of the reference connecting road such that, as indicated by D, it is within a range of ±45 degrees with respect to the reference connecting road, the workstation 11 tracks such connecting segment and considers it part of the reference connection road. If there are a plurality of connecting segments in the forward tracking direction that are within the range of ±45 degrees of the reference connecting road, as indicated by E and F in FIG. 7A, the workstation 11 subsequently tracks the connecting segment having the smallest angle with respect to the reference connecting road and considers it part of the reference connecting road. In this way, for the case of FIG. 7A, the resulting reference connecting road will be as indicated by the bold line. It must be noted that the workstation 11 does not track connecting segments such as one-way roads or the like that prohibit entry of the vehicle.

Figure 7B:
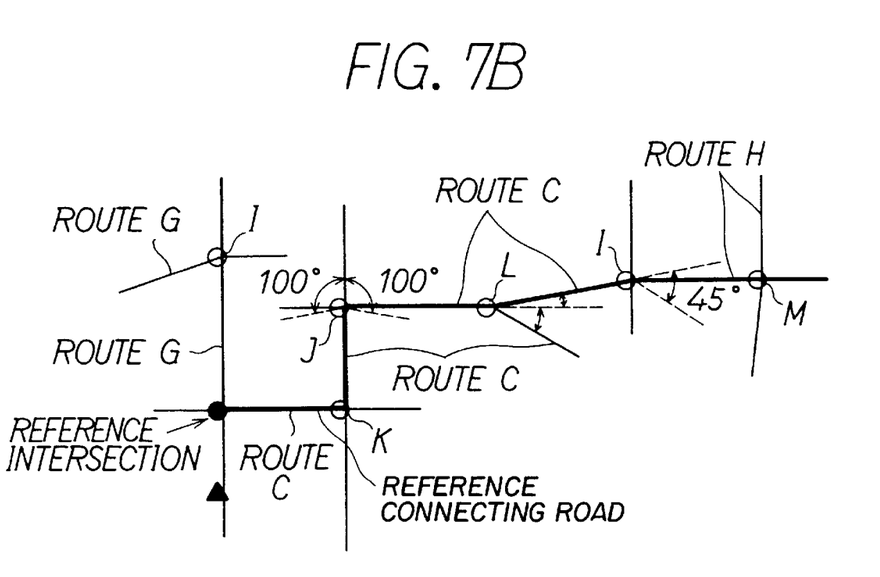

FIG. 7B illustrates a way to track the nodes and the connecting segments along the reference connecting road when the reference connecting road is labeled. For example, the reference connecting road in FIG. 7B has an initial segment labeled "ROUTE C" that is connected to the reference intersection. In this case, to find a connecting segment of the reference connecting road, as shown in points K and J in FIG. 7B, the workstation 11 tracks for the connecting segment having the same label that is within the range of ±100 degrees of the reference connecting road and considers such segment as part of the reference connecting road. When several connecting segments have the same route number as shown in point L, the connecting segment that has the smallest angle with respect to the reference connecting road is tracked and considered as part of the reference connecting road. When there is no segment having the same label within the range of ±100 degrees of the reference connection road, as shown in point I, a connecting segment that allows entry and which is within ±45 degrees of the current reference connecting road is tracked and considered as part of the reference connecting road. Thereafter, at point M, the tracking procedure similar to the procedure when the road has no label (shown in FIG. 7A) is performed. In this way, in the case of FIG. 7B, the resulting reference connecting road will be as indicated by the bold line.

The above-mentioned tracking of the nodes along the connection road is also executed in the station name setting process 200 and subsequent processes 300–500.

Figure 8:
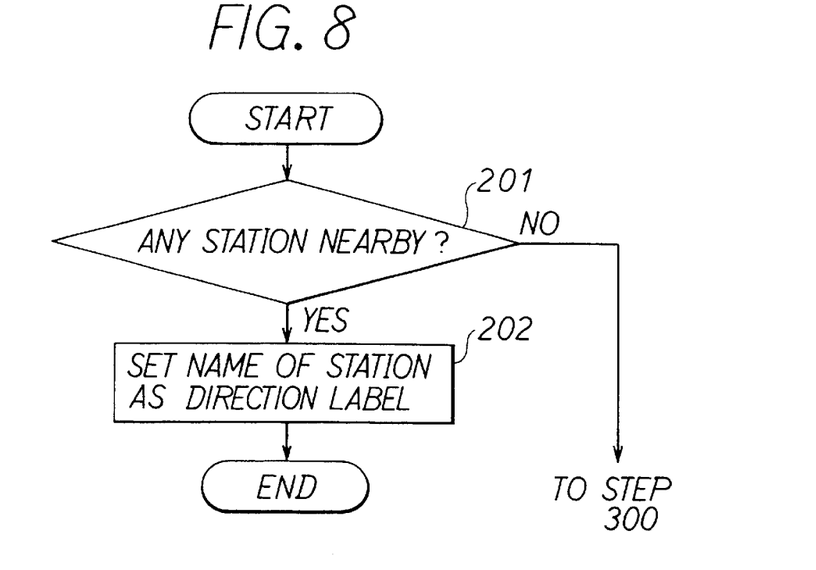
FIG. 8 is a flow chart of a process for setting the name of a station as the direction label.
Figure 9:
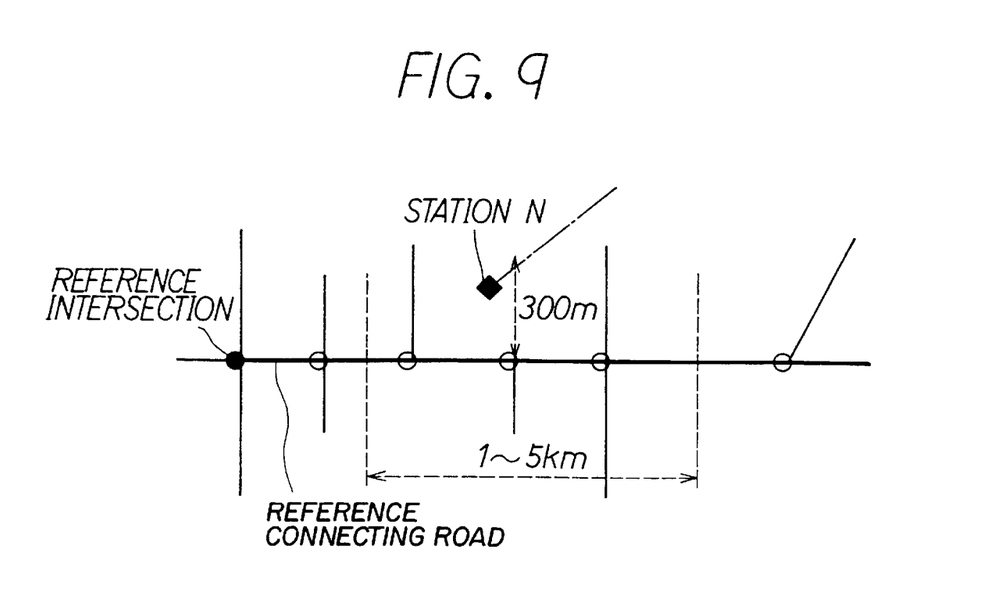
FIG. 9 is a diagram illustrating the setting of the name of a station as the direction label.

Meanwhile, the station name setting process 200 of FIG. 4 is shown in detail in FIG. 8. A concrete example of this setting process 200 is shown in FIG. 9.

With respect to nodes along the reference connecting road that are within 1 km to 5 km from the reference intersection, step 201 tracks the connecting road data and determines if there is a station (i.e., a railroad station, a subway station or the like) that is within, for example, 300 m of a node (preferably, the node nearest to the reference intersection). When step 201 gives a positive output, step 202 sets the name of the station as the direction label of the reference connecting road. For example, as shown in FIG. 9, when the station is called "STATION N", "N" is set as the direction label of the reference connecting road. When there are a plurality of stations, the name of the station nearest to the node is determined as the direction label. However, when the station is named after an administrative unit such as a city, a town or the like such as Nagoya Station being named after Nagoya City, the name of the station is not set as the name of the direction label of the reference connecting road and thus, control goes to step 300.

Figure 10:
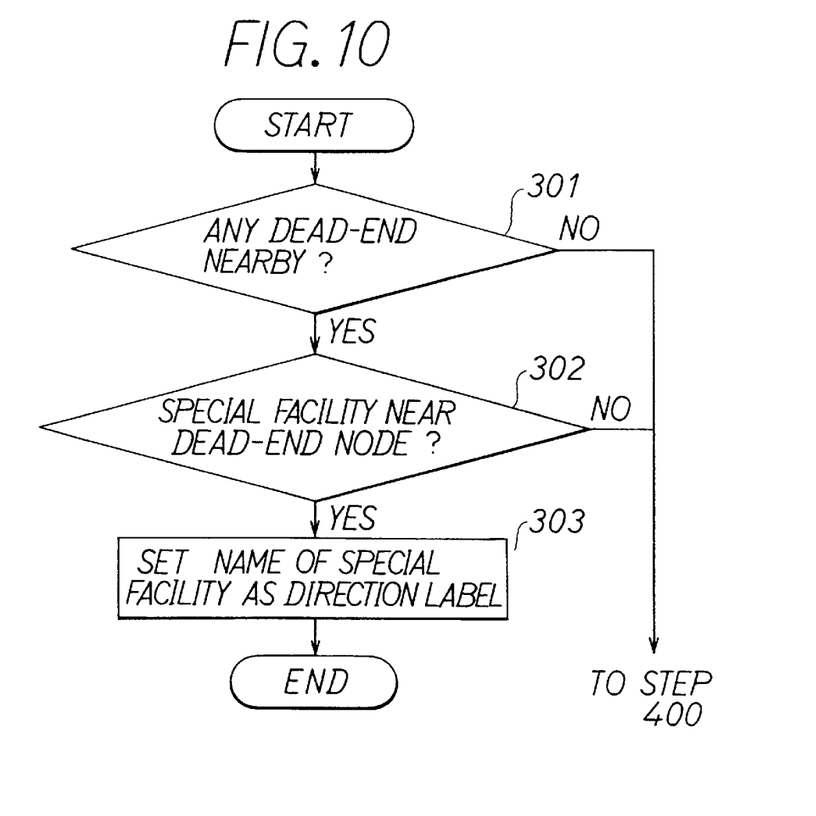
FIG. 10 is a flow chart of a process for setting the name of a special facility as the direction label.
Figure 11:
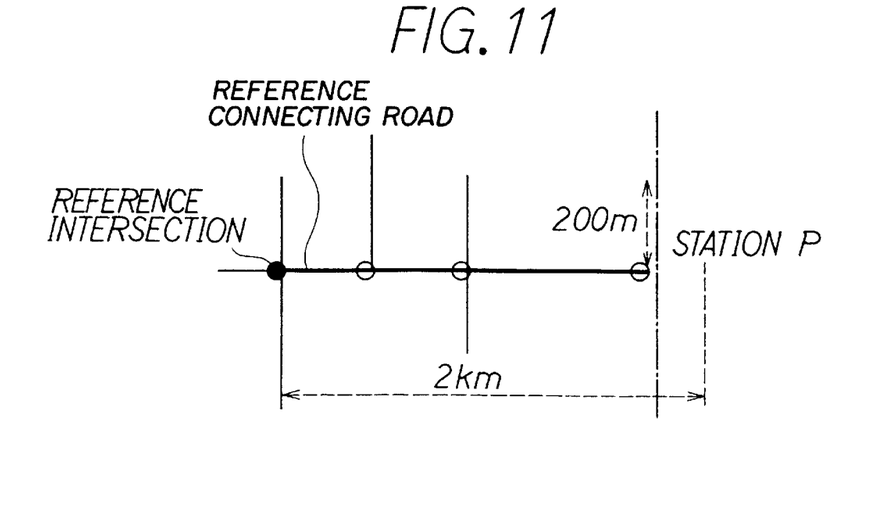
FIG. 11 is a diagram illustrating the setting of the name of a special facility as the direction label.

Details of the special name setting process 300 are explained hereinafter with reference to FIG. 10. FIG. 11 illustrates a concrete example of the execution of the special name setting process 300.

In this special name setting process 300, step 301 tracks the connecting road data and determines whether or not the reference connecting road has a dead end within a radius of, for example, 2 km from the reference intersection. When the connecting road has a dead end, step 302 determines whether or not there is a special facility or a place of interest within a radius of, for example, 200 meters from the dead-end node. Here, examples of such special facilities and places of interest are stations, airports, parks, castles, sightseeing places, aquariums and the like with the names of such special facilities being stored in the map database and assigned with different levels of priority. Step 302 checks for the existence of such special facility or place of interest in accordance with the level of priority. When step 302 determines that there is a special facility or place of interest that is within a radius of 200 m from the dead-end node, step 303 sets the name of such special facility or place of interest as the direction label. In this case, step 303 sets "STATION P" as the direction label.

Figure 12:
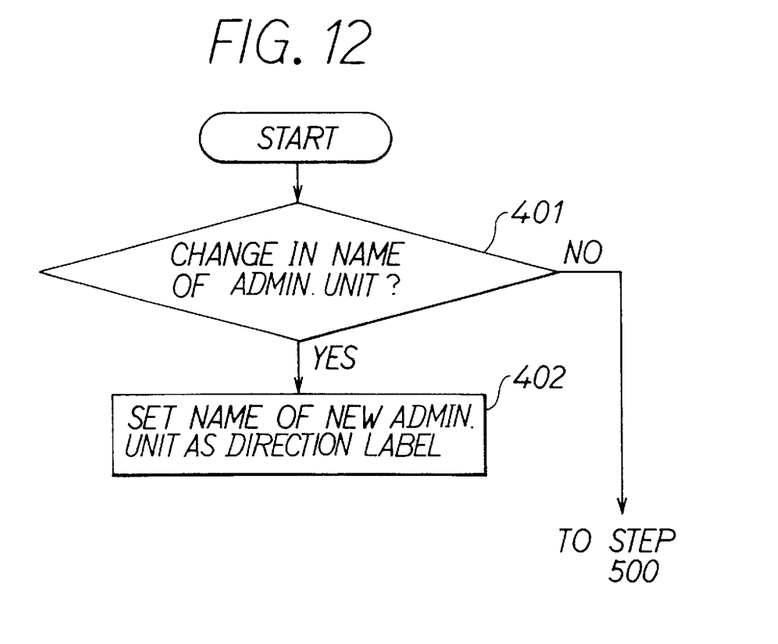
FIG. 12 is a flow chart of a process for setting the name of an administrative unit as the direction label.
Figure 13:
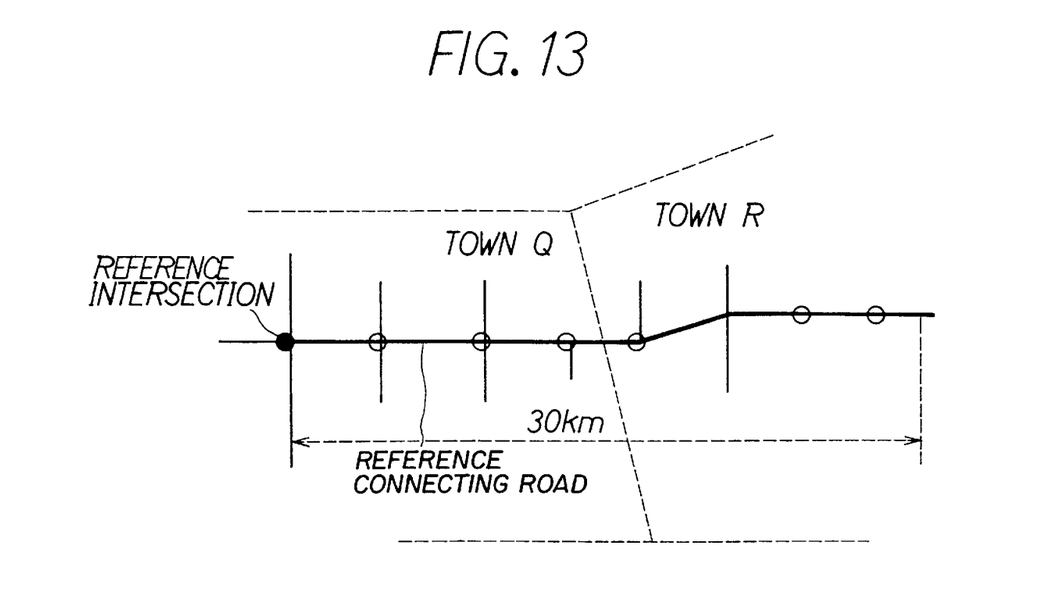
FIG. 13 is a diagram illustrating the setting of the name of an administrative unit as the direction label.
Figure 14:
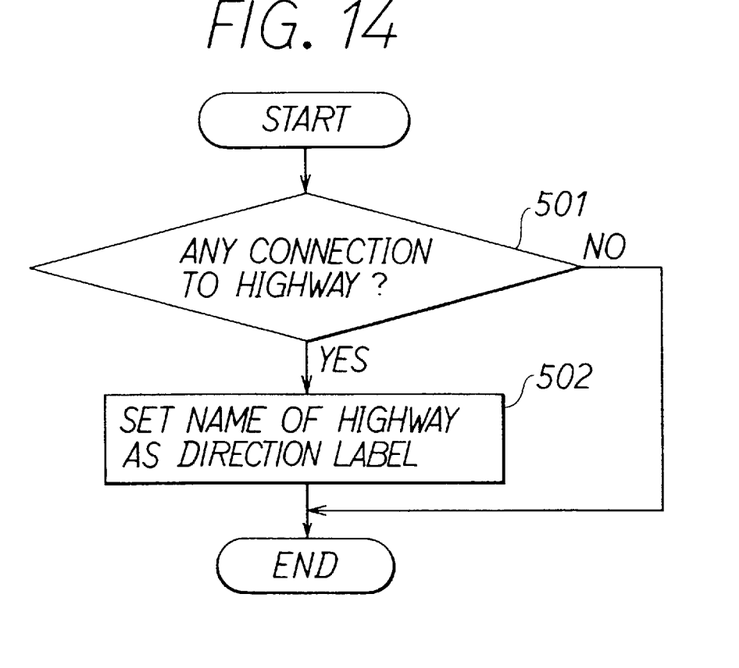
FIG. 14 is a flow chart of a process for setting the name of a highway as the direction label.

However, when step 302 gives a negative output, control goes to the administrative unit name setting process 400 which is shown in detail in FIG. 12. A concrete example of the execution of this administrative unit name setting process 400 is shown in FIG. 13.

In this administrative unit name setting process 400, step 401 tracks the connecting road data and determines if a node, which is along the reference connecting road and within a radius of, for example, 30 km from the reference intersection, is located in an administrative unit (which may be a province, a city, a town or the like) that is different from the administrative unit where the reference intersection is located. When step 401 gives a positive output, step 402 sets the name of the administrative unit where the concerned node is located as the direction label of the reference connecting road. In the case shown in FIG. 12, "TOWN R", which is adjacent to "TOWN Q", is set as the direction label of the reference connecting road.

Figure 15:
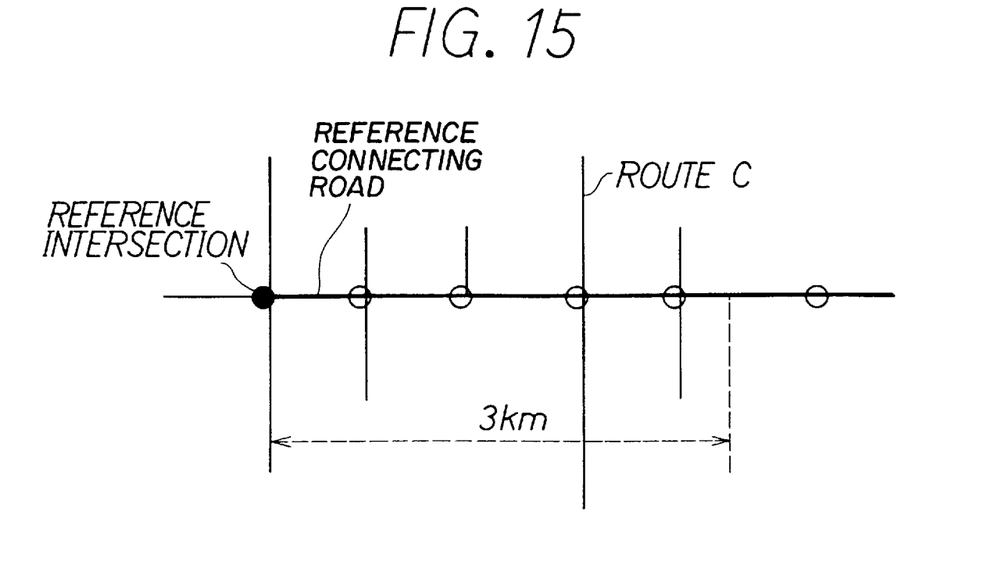
FIG. 15 is a diagram illustrating the setting of the name of a highway as the direction label.

However, when there is no change in the administrative unit, that is, when step 401 gives a negative output, control goes to the highway name setting process 500 which is shown in detail in step 500. A concrete example of the execution of the highway name setting process 500 is shown in FIG. 15.

In the highway name setting process 500, step 501 tracks the connecting road data and determines whether or not there is a highway that can be entered and that is connected to a node of the reference connecting road with the node being within a radius of, for example, 3 km from the reference intersection. When a highway is connected to such a node of the reference connecting road, that is, when step 501 gives a positive output, step 502 sets the highway name as the direction label of the reference connecting road. In the case of FIG. 15, step 502 sets "ROUTE C" as the direction label of the reference connecting road.

When there is no highway connected to a node of the reference connecting road that is within a radius of, for example, 3 km from the reference intersection, no direction label is assigned to the reference connecting road.

The foregoing direction label determination process is executed with respect to all connecting roads at all intersections and the CD-ROM 4a stores the direction label data for use by the vehicular navigation system. Accordingly, the vehicular navigation system displays the direction labels (when applicable, those labels having the highest priorities) with respect to all connecting roads at all intersections irrespective of the route set for performing navigation operations.

Although the present invention has been fully described in connection with preferred embodiments thereof with reference to the accompanying drawings, it is to be noted that various changes and modifications will become apparent to those skilled in the art.

While the present embodiment shows actual values and distances set for obtaining the direction labels, these values and distances may be set in accordance with various requirements and needs. Also, the priority between steps 100 to 500 can also be changed and the priority assigned to various special names or the like can be set to suit various requirements and needs.

While the aforementioned embodiment tracks special facilities near the end of the reference connecting road, the tracking may also be executed based to track for a special facility that is within an area of ±45 degrees around the end of the reference connecting road.

While the present embodiment stores the direction labels beforehand in the CD-ROM 4a, the control unit 6 may read connecting road data and direction label data set related to the respective connecting road data stored in the CD-ROM 4a and subsequently select an appropriate direction label data from the direction label data set when displaying the guide map of the intersection on the display unit 7.

Such changes and modifications are to be understood as being included with the scope of the present invention as defined by the appended claims.

What is claimed is:

1. A navigation system comprising:
   a display unit which displays a guide map of at least a reference road intersection and a reference connecting road connected to said reference road intersection;
   a determination unit which determines a direction label corresponding to a location outside said guide map but which location will be encountered if said reference connecting road is traveled, the direction label being determined by searching for a series of road intersections and connecting roads extending from said reference connecting road; and
   a control unit which effects the display of said direction label.

2. A navigation system according to claim 1, wherein:
   said display unit displays all searched connecting roads connected to said reference road intersection; and
   said control unit controls the display of said direction label of only said connecting roads that allow entry of said vehicle.

3. A navigation system according to claim 2, wherein:
   said determination unit determines said direction labels only of said connecting roads that allow entry of said vehicle.

4. A navigation system according to claim 3, wherein said direction label corresponds to a tollgate, a station, a special facility, an administrative unit or a highway located within a predetermined distance from one of said road intersections.

5. A navigation system according to claim 1, wherein said direction label is selected from a plurality of direction labels by determining the connecting road in the order of higher priority.

6. A navigation system according to claim 1, wherein a route guide arrow is displayed on said guide map along with said direction label.

7. A navigation system according to claim 1, wherein said determination unit checks whether a toll road is located within a predetermined distance from said road intersections and sets a name of a tollgate near said toll road as said direction label for said reference connecting road.

8. A navigation system according to claim 1, wherein said determination unit checks whether a station is located within a predetermined distance from said road intersections and sets a name of said station as said direction label.

9. A navigation system according to claim 1, wherein said determination unit checks whether a dead-end is located on said connecting roads within a predetermined distance from said reference road intersection and whether a special facility is located within another predetermined distance from said dead-end, and sets a name of said special facility as said direction label.

10. A navigation system according to claim 1, wherein said determination unit determines whether an administration unit is changed to a new name along said connecting roads within a predetermined distance from said reference road intersection, and sets said new name as said direction label.

11. A navigation system according to claim 1, wherein said control unit effects the display of said direction label only when said vehicle is within a predetermined distance from said reference road intersection.

12. A navigation system comprising:
a storage unit which stores map data that includes data corresponding to a reference connecting road connected to a reference road intersection and data corresponding to a direction label of said reference connecting road, said direction label being determined by searching for connecting roads extending from said reference connecting road;
a display unit which displays a guide map of said reference road intersection and said reference connecting road based on said map data, said direction label corresponding to a location outside of said guide map but which location will be encountered if said connecting road is traveled; and
a control unit which effects the display of said reference connecting road and the display of said direction label when the vehicle comes into a predetermined distance from said reference road intersection.

13. A navigation system according to claim 12, wherein:
said direction label corresponds to a direction of entry of said vehicle into said connection road, and
said direction label corresponds to a tollgate, a station, a special facility, an administrative unit or a highway which is located along said connecting roads.

14. A navigation system according to claim 1, wherein said direction label is selected from a plurality of direction labels by determining the connecting road in the order of higher priority.

15. A navigation system according to claim 12, wherein said control unit effects the display of said direction label only when said vehicle is within a predetermined distance from said reference road intersection.

16. A map data generation system comprising:
a map database which stores data corresponding to a connecting road connected to a reference road intersection and data corresponding to a set of direction labels, said connecting road including a plurality of road intersections; and
a data generation unit which determines an optimal direction label for said connecting road among said set of direction labels based on a relationship of said connecting road with a direction of entry of a vehicle into said connecting road, said optimal direction label corresponding to a location outside of said guide map but which location is within a predetermined distance from one of said road intersections and will be encountered if said connecting road is taken, and said data generating unit storing mapping data that relates said optimal direction label with said connecting road.

17. A map data generation system according to claim 16, wherein said direction label corresponds to a tollgate, a station, a special facility, an administrative unit or a highway which is located along said connecting road.

18. A map generation method comprising:
retrieving connecting road data corresponding to a connecting road connected to a reference road intersection to which a vehicle is moving and retrieving direction label data of a set of direction labels from a map storage device; and
determining an optimal direction label of said connecting road from among said set of direction labels based on direction of entry of a vehicle into said connecting road, said optimal direction label corresponding to a location outside of said guide map but which location will be encountered if said connecting road is taken.

19. A map data generation method according to claim 8, further comprising:
storing mapping data indicating said optimal direction label of said connecting road in said map storage device.

20. A map generation method according to claim 18, wherein:
retrieving said connecting road data further comprises retrieving connecting road data of every connecting road connected to said reference road intersection through a plurality of road intersections; and
determining an optimal direction label further comprises determining an optimal direction label for every connecting road.

21. A map generation method according to claim 20, wherein each of said direction labels corresponds to a tollgate, a station, a special facility, an administrative unit or a highway located along said road intersections.

22. A navigation system comprising:
a display unit which displays a guide map of a reference road intersection and a reference connecting road connected to said reference road intersection;
a determination unit which determines a direction label corresponding to a direction a vehicle would travel if the vehicle were to enter said reference connecting road, said direction label being an object which is located ahead of said reference connecting road and away from said reference road intersection and being determined by searching for a series of connecting roads extending from said reference connecting roads through road intersections; and
a control unit which controls the display of said guide map and said direction label of said connecting road, wherein said display unit displays all reference connecting roads connected to said reference road intersection, and wherein
said control unit only displays said direction labels of said connecting roads that allow entry of said vehicle.

23. A navigation system according to claim 22, wherein a route guide arrow is displayed on said guide map displayed on said display unit along with said direction label.

24. A navigation system according to claim 22, wherein said determination unit checks whether a toll road is located within a predetermined distance from said road intersections and sets a name of a tollgate near said toll road as said direction label for said connecting road.

25. A navigation system according to claim 22, wherein said determination unit checks whether a station is located within a predetermined distance from said road intersections, and sets a name of said station as said direction label.

26. A navigation system according to claim 22, wherein said determination unit checks whether a dead-end is located on said connecting roads within a predetermined distance from said reference road intersection and whether a special facility is located within another predetermined distance from said dead-end, and sets a name of said special facility as said direction label.

27. A navigation system according to claim 22, wherein said determination unit determines whether an administration unit is changed to a new name along said connecting roads within a predetermined distance from said reference road intersection, and sets said new name as said direction label.

28. A method to assist in navigating a moving object comprising:

indicating a present position of a vehicle on a display map;

displaying a reference road intersection and a reference connecting road extending from the reference road intersection when the vehicle approaches the reference road intersection;

searching for a predetermined object located along a series of connecting roads which are not displayed in an enlarged map of the reference road intersection, the reference connecting roads extending from the reference connecting road through respective road intersections, the predetermined object being searched with respect to each of the connecting roads and the road intersections; and indicating on the enlarged map a direction label indicative of the predetermined object to indicate that the vehicle will encounter the predetermined object if the vehicle travels the reference connecting roads.

29. A vehicular navigation method according to claim 28, wherein the searching comprises searching the connecting roads which are located within a predetermined distance from the reference road intersection.

30. A vehicular navigation method according to claim 29, wherein the direction label is limited to an object which is associated with the road intersections existing ahead of the reference road intersection and outside of the enlarged map.

31. A vehicular navigation method according to claim 28, wherein the predetermined object is at least one of a toll gate for a toll road, a station, a dead-end with a special facility near the dead-end, and a new administration unit, each of which is located within a predetermined distance from the road intersections existing ahead of the reference intersection and outside of the enlarged map.

32. A vehicular navigation method according to claim 28, further comprising:

determining one of the series of the connecting roads that connects one of the series of the connecting roads with the smallest crossing angle relative to the determined connecting road, if a plurality of connecting roads are available from the determined connecting road.

33. A vehicular navigation method comprising:

indicating a present position of a vehicle on a displayed map;

displaying a reference road intersection and a reference connecting road extending from the reference intersection when the vehicle approaches the reference intersection;

searching for a plurality of predetermined objects located along a series of connecting roads not displayed and extending from the reference connecting road through respective road intersections, the predetermined objects having different search priority levels and being searched with respect to each of the connecting roads and the road intersections from an object which has a highest search priority level; and indicating a direction label indicative of one of the predetermined objects found first in the searching, thereby indicating that the vehicle will encounter the predetermined object if the vehicle travels the reference connecting roads.

34. A vehicular navigation method according to claim 33, wherein the predetermined objects include at least some of a toll gate for a toll road, a station, a dead-end and a special facility near the dead-end, and a new administration unit, each of which is located within a predetermined distance from the road intersections existing ahead of the reference intersection and outside of the enlarged map.

* * * * *